United States Patent
Hollinger et al.

[11] Patent Number: 5,280,339
[45] Date of Patent: Jan. 18, 1994

[54] CLOSED LOOP FIBER OPTIC GYROSCOPE WITH FINE ANGLE RESOLUTION

[75] Inventors: Walter P. Hollinger, Mahwah; Kevin M. Killian, Lincoln Park; Robert A. Kovacs, West Orange, all of N.J.

[73] Assignee: AlliedSignal Inc., Morris Township, Morris County, N.J.

[21] Appl. No.: 873,910

[22] Filed: Apr. 24, 1992

[51] Int. Cl.⁵ .............................. G01C 19/64
[52] U.S. Cl. .................................... 356/350
[58] Field of Search .......................... 356/350

[56] References Cited

U.S. PATENT DOCUMENTS 5,116,129 5/1992 Ishigami .................. 356/350

Primary Examiner—Vincent P. McGraw
Attorney, Agent, or Firm—Howard G. Massung; Donald B. Paschburg

[57] ABSTRACT

A closed loop fiber optic gyro features signal processing wherein square wave phase modulation is added to a modulation drive signal after overflow logic so that the square wave modulation will not cause a phase modulation ramp to exceed overflow/underflow logic limits. The arrangement is such that the phase modulation causes a retrace with each modulation period when the amplitude of the ramp is within predetermined limits. Corrections to the retrace limit are implemented so as to scale a digital output, which enables the determination of accumulated gyro angle with a finer resolution than simple output pulse accumulation as has heretofore been the case.

8 Claims, 8 Drawing Sheets

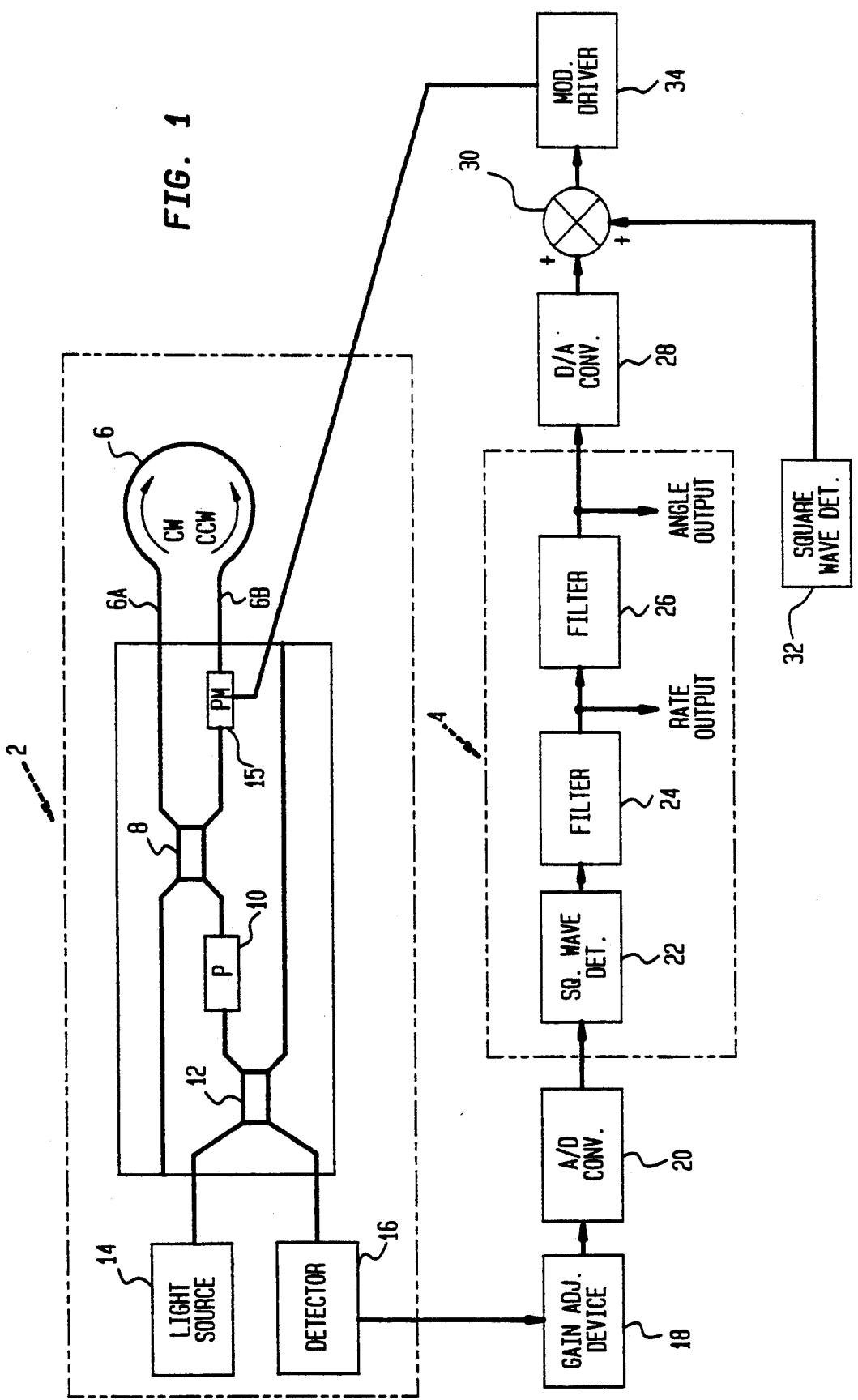

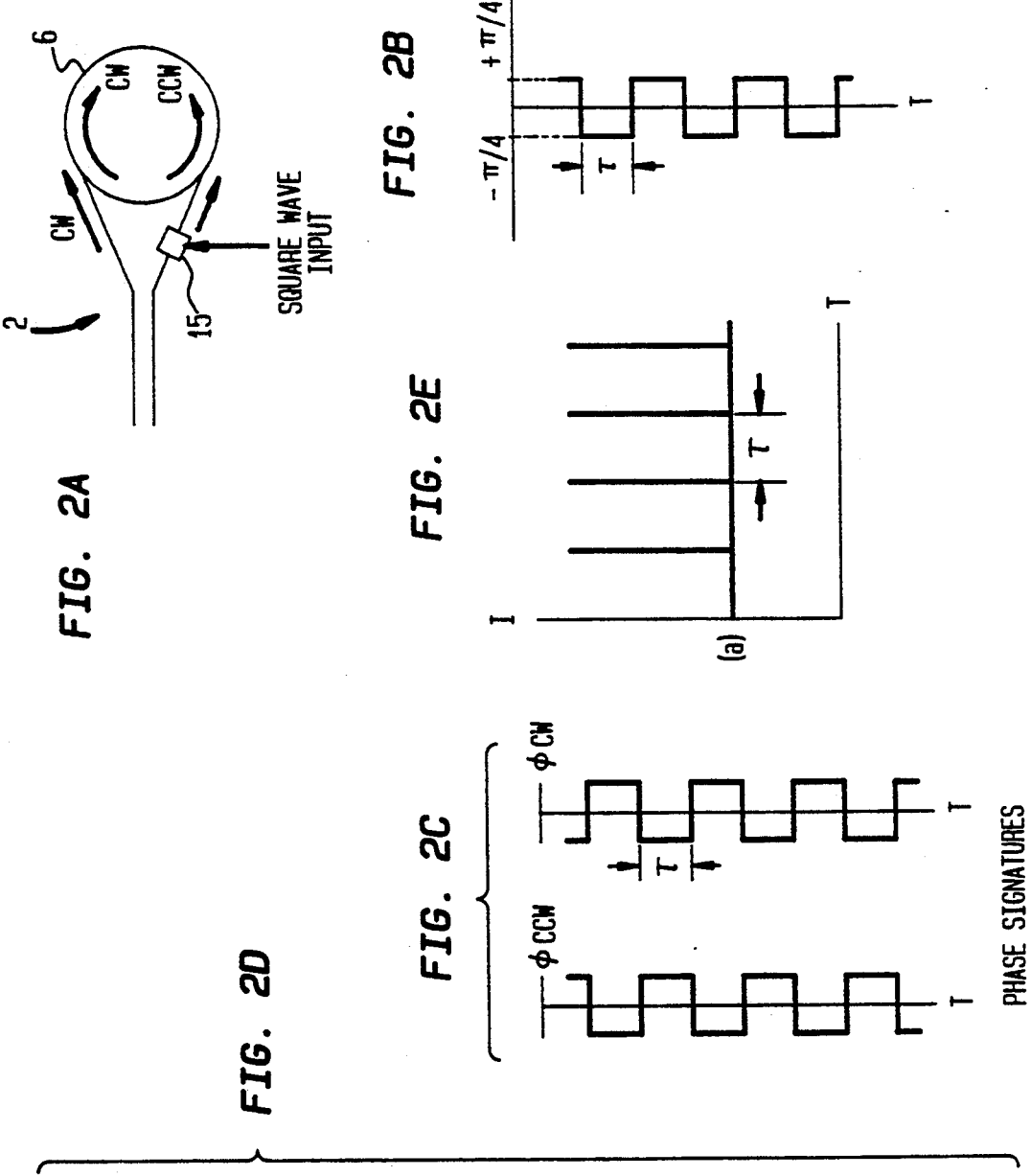

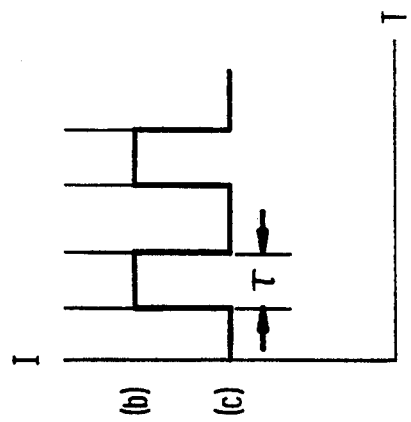
FIG. 3C
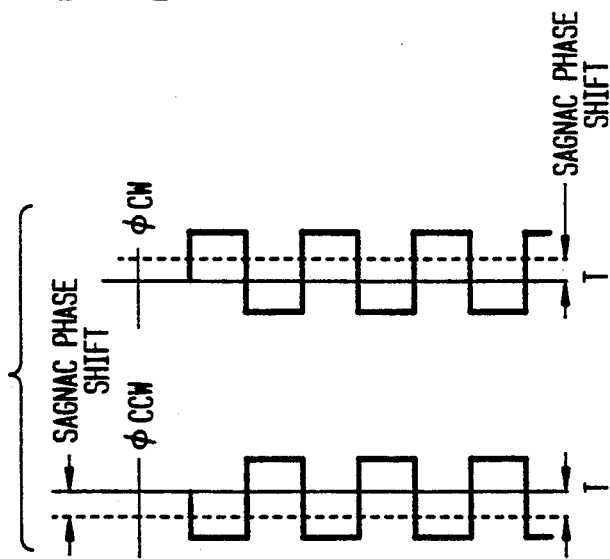
FIG. 3A
FIG. 3B
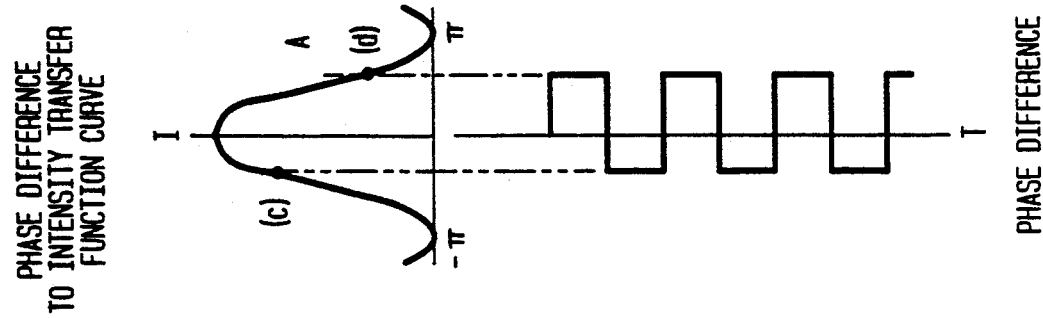

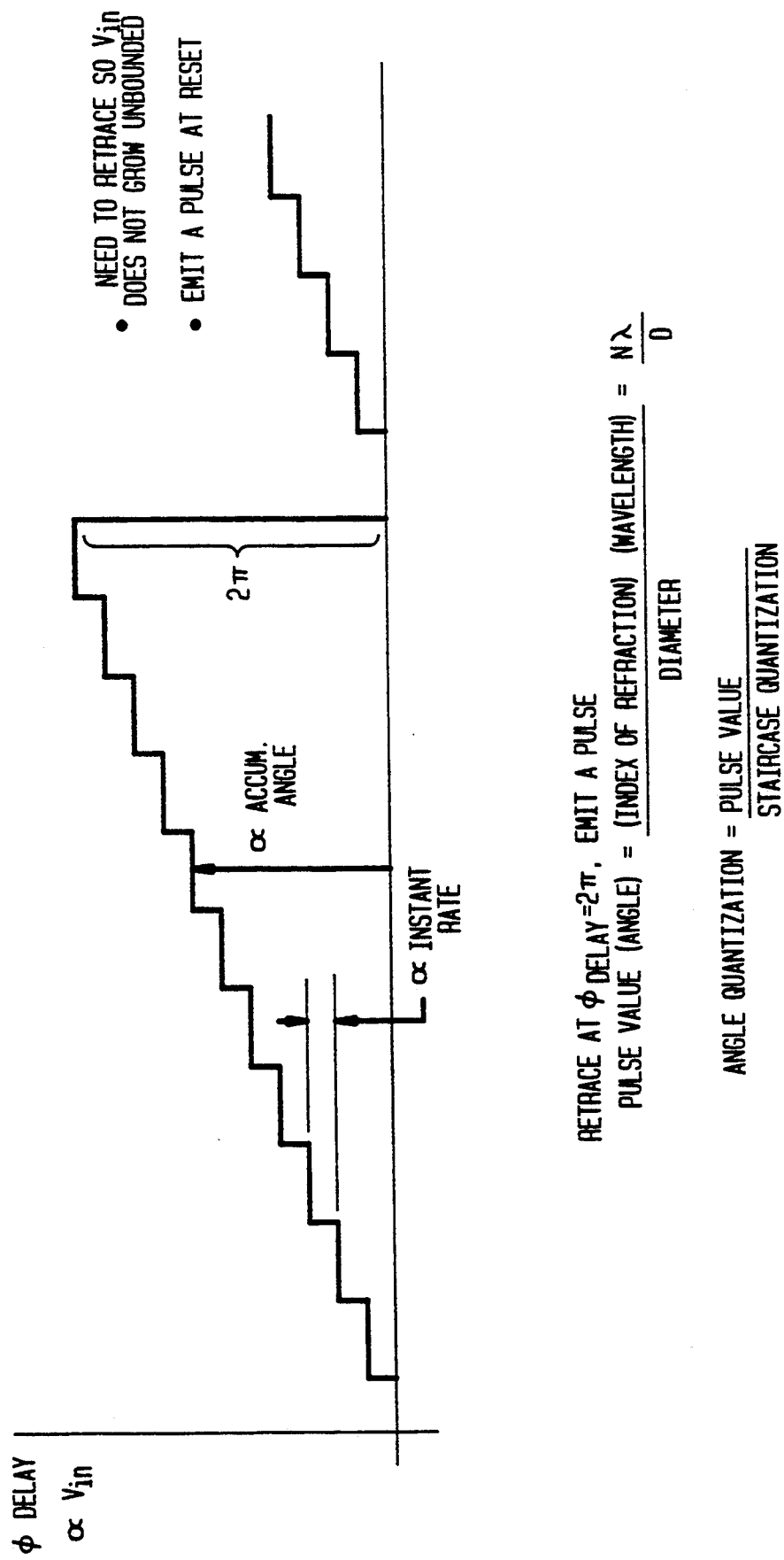

CLOSED LOOP FIBER OPTIC GYROSCOPE WITH FINE ANGLE RESOLUTION

CROSS REFERENCE TO RELATED APPLICATIONS

This application is related to copending, commonly assigned U.S. application Ser. Nos. 873,911 for a Closed Loop Fiber Optic Gyroscope With Improved Performance and 873,133 for a Closed Loop Fiberoptic Gyroscope With reduced Sensitivity To Electronic Drift, filed on even date herewith by the inventors herein.

BACKGROUND OF THE INVENTION

This invention relates generally to fiber optic gyroscopes (gyros) and particularly to a closed loop fiber optic gyro having a signal processing arrangement which features fine angle resolution.

It is well established that closed loop fiber optic gyro signal processing can be achieved through ramp phase modulation. Arrangements for accomplishing this are described in the following references: *Progress In Optical Fiber Gyroscopes Using Integrated Optics*, Lefevre, et al, 37th Meeting of the Electromagnetic Wave Propagation Panel of the Advisory Group for Aerospace Research and Development (NATO), Istanbul, Turkey, Sep. 23–27, 1985; *Double Closed-Loop Hybrid Fiber Gyroscope Using Digital Phase Ramp*, Lefevre, et al, Proceedings of the Conference on Optical Fiber Sensors, Optical Society of America, Feb. 11–14, 1985; and *Utilization of Fiber Optic Gyros in Inertial Measurement Units*, Matthews, The Institute of Navigation Proceedings of the National Technical Meeting, Jan. 23–25, 1990.

The present invention will be described with reference to a "minimum reciprocal configuration" fiber optic gyro which acts as an optical interferometer. The desired optical phase shifts in the interferometer are derived from two sources: (1) the Sagnac phase shift from a rotation rate imposed on a fiber optic coil through which clockwise and counterclockwise light beams travel; and (2) phase shifts imposed by a phase modulator.

The invention uses square wave phase modulation in order to create an output error signal. A square wave is applied to an optical phase modulator. This generates phase signatures for the clockwise and counterclockwise light beams. The difference between the two signatures is applied to a phase difference-intensity transfer function to determine output intensity. If the Sagnac phase shift is constant, the phase difference between the clockwise and counterclockwise beams alternates between two distinct values. These values relate to operating points on a phase difference-intensity transfer function curve. Spikes in the output waveform are a result of tracing out the portion of the transfer function between two operating points. This occurs every ($\tau$) seconds, during the fast transitions between operating points. Ignoring the spikes, the peak-peak output square waveform has an amplitude that directly measures the net non-reciprocal phase shift between the clockwise and counterclockwise light beams.

SUMMARY OF THE INVENTION

This invention contemplates a closed loop fiber optic gyro featuring signal processing for fine angle resolution. Square wave phase modulation is used to create an output error signal. The square wave phase modulation is added to a modulation drive signal after overflow logic in either an analog or digital domain. Therefore, the square wave modulation will not cause a phase modulation ramp to exceed overflow/underflow logic limits. Commonly, the square wave modulation has an amplitude of ($+\pi/4$) radians. This maximizes the error signal used in a feedback loop. In this case, the phase modulation causes a retrace with each modulation period when the amplitude of the ramp is less than ($\pi/4$) or greater than the retrace threshold minus ($\pi/4$). With a retrace threshold ($2\pi$), the signal processing will spend one-fourth of its time in the retrace mode. In addition, a large number of overflow/underflow pulses will typically accompany a retrace. Even though the sum of the overflow/underflow pulses will ultimately be correct, any polling of the accumulated pulses could potentially have an error of one pulse, if the polling is done during a time period when the square wave modulation itself causes pulses.

The arrangement of the invention considers the square wave amplitude from a cycle immediately after a retrace as errant data that should be excluded from a phase nulling loop. With the arrangement described, corrections of the retrace limit are implemented so as to scale a digital output. The arrangement enables determination of accumulated gyro angle with a finer resolution than simple output pulse accumulation as has heretofore been the case.

BRIEF DESCRIPTION OF THE DRAWINGS

FIG. 1 is a block diagram illustrating a closed loop fiber optic gyro configured in accordance with the invention.

FIGS. 2A–2E are diagrammatic representations illustrating the effect of square wave phase modulation according to the invention, wherein there is no gyro rotational rate, and illustrating the generation of an associated phase difference to intensity transfer function curve.

FIGS. 3A–3C are diagrammatic representations illustrating the effect of square wave phase modulation according to the invention wherein there is a gyro rotational rate, and illustrating the generation of an associated phase difference to intensity transfer function curve.

FIG. 8 is a graphical representation illustrating the periodic resetting of the staircase pattern.

DETAILED DESCRIPTION OF THE INVENTION

Figure 4:
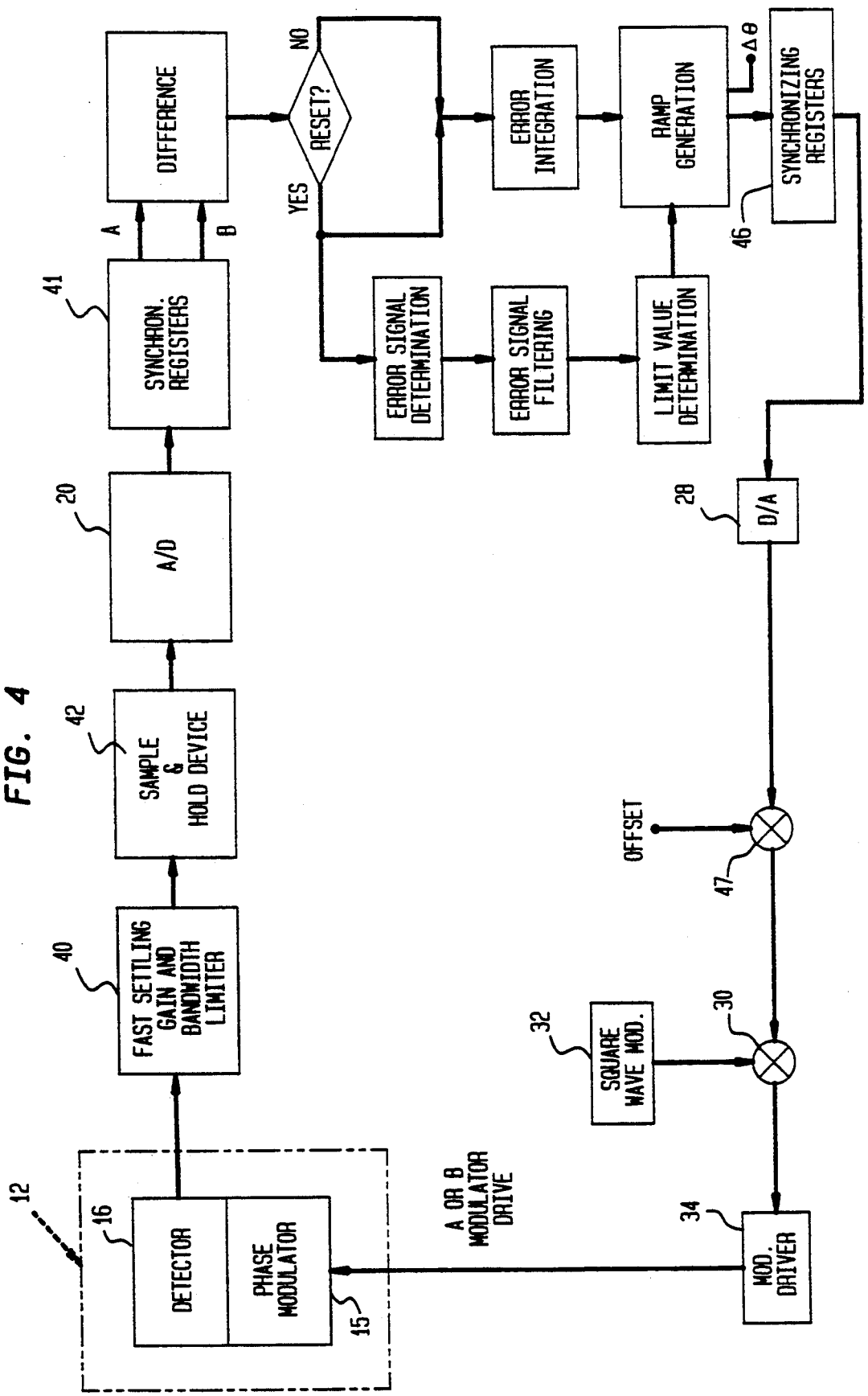
FIG. 4 is a complete block diagram illustrating one form of signal processing according to the invention, and showing an appropriate flow chart segment.

FIG. 1 illustrates a minimum reciprocal fiber optic gyro as contemplated by the invention and designated by the numeral 2. A signal processing implementation is designated by the numeral 4. Gyro 2 and signal processing implementation 4 cooperate to provide a closed-loop minimum reciprocal fiber optic gyro configuration.

Gyro 2 includes a fiber optic coil 6 having an end 6A coupled through a directional coupler 8, a polarizer (P) 10 and a directional coupler 12 to a light source 14. Another end 6B of fiber optic coil 6 is coupled through a phase modulator (PM) 15, directional coupler 8, polarizer (P) 10 and directional coupler 12 to a photo detector 16. The arrangement is such that a light beam from light source 14 is split into two beams. One of the two beams travels around coil 6 in a clockwise (CW) direction and the other beam travels around coil 6 in a counter-clockwise (CCW) direction. The phase shift between the clockwise and counter-clockwise traveling beams is detected by detector 16 which provides a corresponding square wave analog electrical output. The gain of the analog output is adjusted by a gain adjustment device 18.

The gain adjusted analog square wave output is applied to an analog to digital (A/D) converter 20 which digitizes the square wave output, and therefrom to signal processing implementation 4, which is a digital implementation, and includes a square wave detector 22, a filter 24 and a filter 26. Thus, the square wave digital output from A/D converter 20 is applied to square wave detector 22 and therefrom to filter 24. The output from filter 24 which corresponds to the rotational rate of gyro 2 is applied to filter 26. The output of filter 26 corresponds to the rotational angle of the gyro.

The output from filter 26 is applied to a digital to analog converter (D/A) 28, and the analog output therefrom is applied to a summing means 30. The output from a square wave generator 32 is applied to summing means 30 and summed thereat with the analog output from D/A converter 28 to provide a summed output. The summed output is applied to a modulator driver 34 which is connected to phase modulator (PM) 15 for driving the phase modulator to provide a closed loop gyro/signal processing configuration. Significantly the output from square wave generator 32 is added to the closed loop after the digital to analog conversion accomplished by D/A converter 28 to achieve the purposes of the invention as will hereinafter become evident.

As aforenoted, gyro 2 acts as an optical interferometer with the desired optical phase shifts being in accordance with the Sagnac phase shift from a rotational rate imposed on coil 6 and phase shifts imposed by phase modulator (PM) 15.

The Sagnac phase shift ($\Delta\phi s$) is expressed as:

$$\Delta\phi s = (2\pi DL/\lambda C)\Omega \qquad (1),$$

where ($\lambda$) is the wavelength of the light from light source 14, (D) and (L) are the diameter and length, respectively, of coil 6, and ($\Omega$) is the input rotation rate about the axis of coil 6 as seen by gyro 2.

Phase modulator 15 imposes phase shifts by virtue of a time delay ($\tau$) for travel of the light beam from light source 14 through coil 6. Thus, for gyro 2, the light beam that travels counter-clockwise through coil 6 will reach phase modulator 15 ($\tau$) seconds earlier than the clockwise traveling light beam. If phase modulator 15 changes state in those ($\tau$) seconds, then the phase modulator has imposed a non-reciprocal phase shift between the clockwise and counterclockwise light beams.

The invention disclosed herein uses square wave modulation via square wave generator 32 to create an output error signal. The effect of the square wave modulation is illustrated in FIGS. 2A–2E (without gyro rotational rate) and FIGS. 3A–3C (with gyro rotational rate), wherein elements corresponding to those in FIG. 1 carry corresponding numerical designations.

Thus, a square wave input (FIG. 2B) is applied to phase modulator 15 as illustrated and described with reference to FIG. 1, and illustrated in abbreviated form in FIG. 2A. This gives rise to the clockwise and counter-clockwise beam phase signatures shown in FIG. 2C. As illustrated in FIG. 2D, the difference between these two phase signatures is applied to the phase difference-intensity transfer function curve to determine output intensity (I). Operating points on the phase difference to intensity transfer function curve shown in FIG. 2D are designated as (a) and (b). Detector 16 (FIG. 1) provides an output having spikes illustrated in FIG. 2E which are the result of tracing out the portion of the transfer function curve between the operating points.

With reference to FIGS. 3A, 3B and 3C which are analogous to FIGS. 2C, 2D and 2E, respectively, but applicable to gyro 2 having a rotational rate as aforenoted, if the Sagnac phase shift (FIG. 3A) is constant, the phase difference between the clockwise and counter-clockwise beams alternates between two distinct values. These values relate to operating points (c) and (d) on the transfer function curve (FIG. 3B). In this case the spikes in the output of detector 16 are illustrated in FIG. 3C.

The output spikes (FIGS. 2E and 3C) occur every ($\tau$) seconds during the fast transitions between operating points. Ignoring the spikes, the peak - peak output square waveform from detector 16 has an amplitude that is a direct measurement of the net non-reciprocal phase shift between the clockwise and counter-clockwise light beams.

Figure 5:
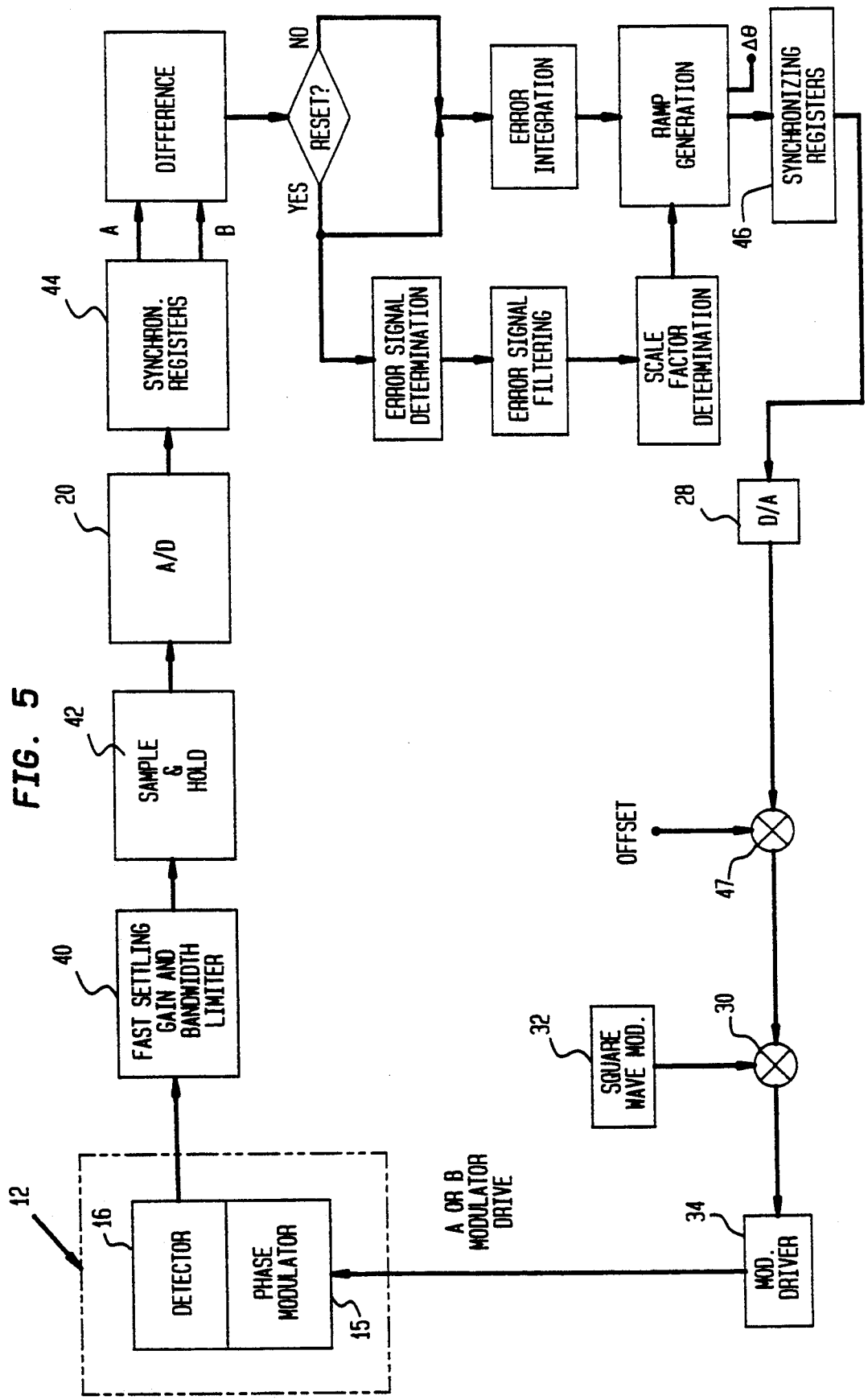
FIG. 5 is a complete block diagram illustrating another form of signal processing according to the invention, and showing an appropriate flow chart segment.

FIGS. 4 and 5 are block diagrams of the signal processing contemplated by the present invention, and wherein elements corresponding to those in FIG. 1 have corresponding numerals. This signal processing features analog and digital portions.

Figure 6:
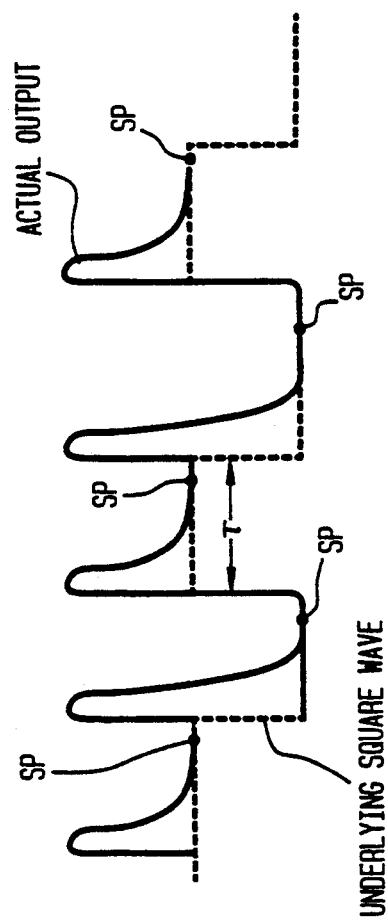
FIG. 6 is a graphical representation illustrating a settling and sampling feature of the invention.

The analog portion features fast settling gain and bandwidth limiting as accomplished by limiter 40 for eliminating the effects of the output spikes that result from the aforenoted square wave modulation. In this regard, it is noted that the fast settling of the gain together with subsequent data sampling via a sample and hold device 42 in the ($\tau$) second time period reduces the influence of the output spikes. The settling and sampling waveform is illustrated in FIG. 6, wherein the underlying square wave (shown in dotted lines) is superimposed on the actual output and the sampling points are indicated as (SP). The output of sample and hold device 42 is applied to A/D converter 20 and therefrom to synchronizing registers 44.

The output of the square wave from square wave generator 32 has a period of ($2\tau$). During the first half cycle of the square wave modulation (the A phase) the square wave modulator output has a high value and during the second half cycle (the B phase) the square wave output has a low value. Homodyne detection is featured which is essentially synchronous demodulation.

In the above described configuration, the peak - peak intensity (A phase output - B phase output) of the square wave output ($I_{pk-pk}$) is as follows:

$$I_{pk-pk} = I_{out} \sin 2\phi_m \sin \Delta\phi, \qquad (2)$$

wherein ($I_{out}$) is the maximum output intensity of gyro 2 under total constructive interference of the clockwise (CW) and counterclockwise (CCW) beams from light source 14, ($\phi_m$) is the zero peak amplitude of the square wave phase modulation input and ($\Delta\phi$) is the clockwise/counter-clockwise optical phase difference. FIGS. 2A-2D and 3A-3C graphically illustrate the gyro output intensity changes described in equation 2.

Figure 7:
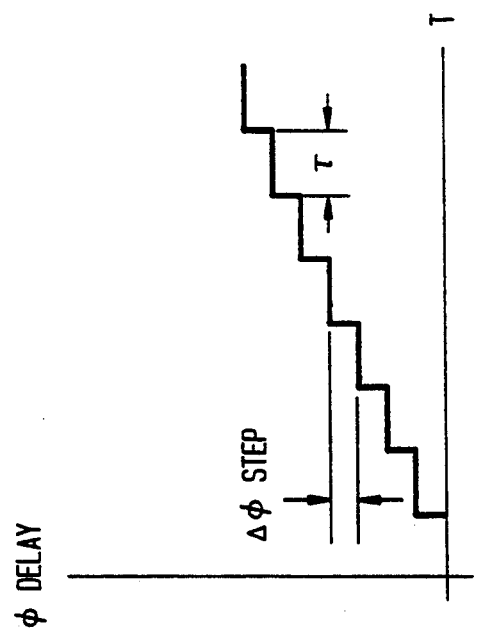
FIG. 7 is a graphical representation illustrating a digital signal output in a staircase pattern provided in accordance with the invention.

The closed loop signal processing illustrated in FIG. 1 is designed to force ($\Delta\phi$) to zero. The amplitude of the square wave output from detector 16 is the error signal in the feedback loop. When the feedback loop has settled, a steady state condition exists as shown in FIG. 7. The output of the digital signal processing is a staircase pattern as illustrated in the Figure, where the time duration of each step is ($\tau$) seconds. With this waveform, a clockwise-counterclockwise phase difference equal to the step height is imposed. The feedback loop varies the step height in order to drive the error signal to zero. At this point, the phase shift represented by the step height is equal and opposite to the Sagnac phase shift. Therefore, a measure of the step height is all that is required to discern rotational rate of gyro 2 as seen by coil 6.

It will be appreciated that the task of the feedback and signal processing described above is to establish the correct step height and to properly interpret the step value to establish the rotational rate of gyro 2. A simplified block diagram of the feedback loop is illustrated in FIG. 1. The details of the digital signal processing are illustrated in FIGS. 4 and 5, as will be next discussed.

FIGS. 4 and 5 show a branch of a flow-chart for accomplishing the noted purpose. It will be understood that creation of a staircase pattern (FIG. 7) eventually leads to the problem of reaching practical limits on phase delays imposed by modulator 15 and drive voltage inputs to the modulator from modulator driver 34. This problem is solved by periodically re-setting the staircase waveform as illustrated in FIG. 8. With this approach, the retrace occurs when the phase delay attempts to go outside the range (0, $2\pi$). A pulse is emitted when a retrace occurs and the pulses are identified as "up" pulses indicating an upward staircase exceeding ($2\pi$) or "down" pulses indicating a downward staircase below (0). Each pulse represents an incremental angular rotation ($\Delta\theta$) of gyroscope 2.

($m2\pi$), (with m being any integer $\neq 0$), is a convenient choice for the retrace limit. This value causes the pulse output to be equivalent to an angular motion equal to ($mn\lambda/D$) defined as the pulse value, where (n) is the index of refraction of the fiber in coil 6. Additionally, a retrace of precisely ($m2\pi$) causes no change in gyroscope square wave output. To appreciate this, note that the retrace temporarily adds ($m2\pi$) to the value of ($\Delta\phi$) for ($\tau$) seconds after the retrace. Equation (2) shows that the square wave output depends on ($\Delta\phi$) through a sine function which has a period of ($2\pi$). Therefore, a retrace of ($m2\pi$) causes no change in the square wave output.

The phase delay imposed by phase modulator (PM) 15 is not measured directly. Rather, the phase delay is the result of a transfer function acting on a voltage input into modulator driver 34. Monitoring this transfer function is essential to insure correct interpretation of output data. The use of an ($m2\pi$) retrace enables this. To insure that the resets are precisely ($m2\pi$), the reset limit voltage is altered until the resulting retraces cause no change in the square wave output of gyro 2. The flow-chart segments in FIGS. 4 and 5 accomplish this.

Thus, with reference to FIGS. 4 and 5, the output of sample and hold device 42 is applied to an analog to digital converter 20 (see FIG. 1) and the digital output from converter 20 is applied to synchronizing registers 44. Synchronizing registers 44 provide outputs A and B corresponding to the A and B phases, respectively, of the output of square wave generator 32, as aforenoted.

Thus, the error signal for the retrace loop is the difference between the detected square wave amplitude of the cycle just preceding the retrace and the square wave amplitude of the cycle just following the retrace. For these purposes, one cycle consists of ($2\tau$) seconds, encompassing one A modulation phase and one B modulation phase. In one manifestation of the invention, the errant data from the cycle immediately following the retrace is not used in the phase shift nulling feedback loop. In this case, the previous value of the square wave amplitude is repeated as an input to the error signal integration block of the flow-chart segments.

In the manifestation of the invention illustrated in FIG. 4, a filtered error signal is used for a retrace limit value determination. In the manifestation of the invention illustrated in FIG. 5, the filtered error signal is used in a scale factor determination which scales the output to make the re-set equal to ($2\tau$). In either case, the filter time constant is initially small to provide fast settling of the limit determination when gyroscope 2 is first turned on. As a retrace loop is employed an increased number of times, the time constant increases. This smoothes the output and reduces the influence of any single piece of data.

With continued reference to FIGS. 4 and 5, the limit value determination or the scale factor determination, as the case may be, is used for ramp generation which drives synchronizing registers 46. The output from synchronizing registers 46 is applied to digital to analog converter 28 (see FIG. 1). The output from digital to analog converter 28 is summed with an offset output by a summing means 47 and the summed output therefrom is applied to summing means 30 (see FIG. 1) and therefrom to modulator driver 34 (see FIG. 1). The ramp generation output is total accumulated angle ($\Delta\theta$) as determined by equation 4 below.

Thus, the retrace limit is established very accurately. This enables the determination of the instantaneous rotational rate and a fine measurement of the accumulated angular rotation of gyro 2. The signal processing herein described prevents the digital values of the extant step height (h), staircase voltage level (r) and limit voltage level (l). From this data, the Sagnac phase shift is:

$$\Delta\phi s = 2\pi S/L \quad (3)$$

The rotational rate of gyro 2 can be determined by substituting equation 3 into equation 1. The total accumulated angle ($\Delta\theta$) is:

$$\Delta\theta = (N + r/l)p, \quad (4)$$

where (N) is the number of accumulated pulses (the difference between the number of up pulses and the number of down pulses) and (P) is the output pulse weight, equal to ($mn\lambda/D$) as stated earlier.

The resolution of the measurement of total accumulated angle is (p/l). If the retrace limit loop is set to allow +10 percent variation in the reset limit and D/A converter 28 has twelve bits, then (l) can vary from approximately 3248 to 4095. In a typical fiber optic gyro configuration with ($\lambda$) equal to (1.3$\mu$m) and (D) equal to (1.9 inches), (p) will be approximately 8 arc seconds and the resolution will be a small fraction of an arc second.

Figure 9:
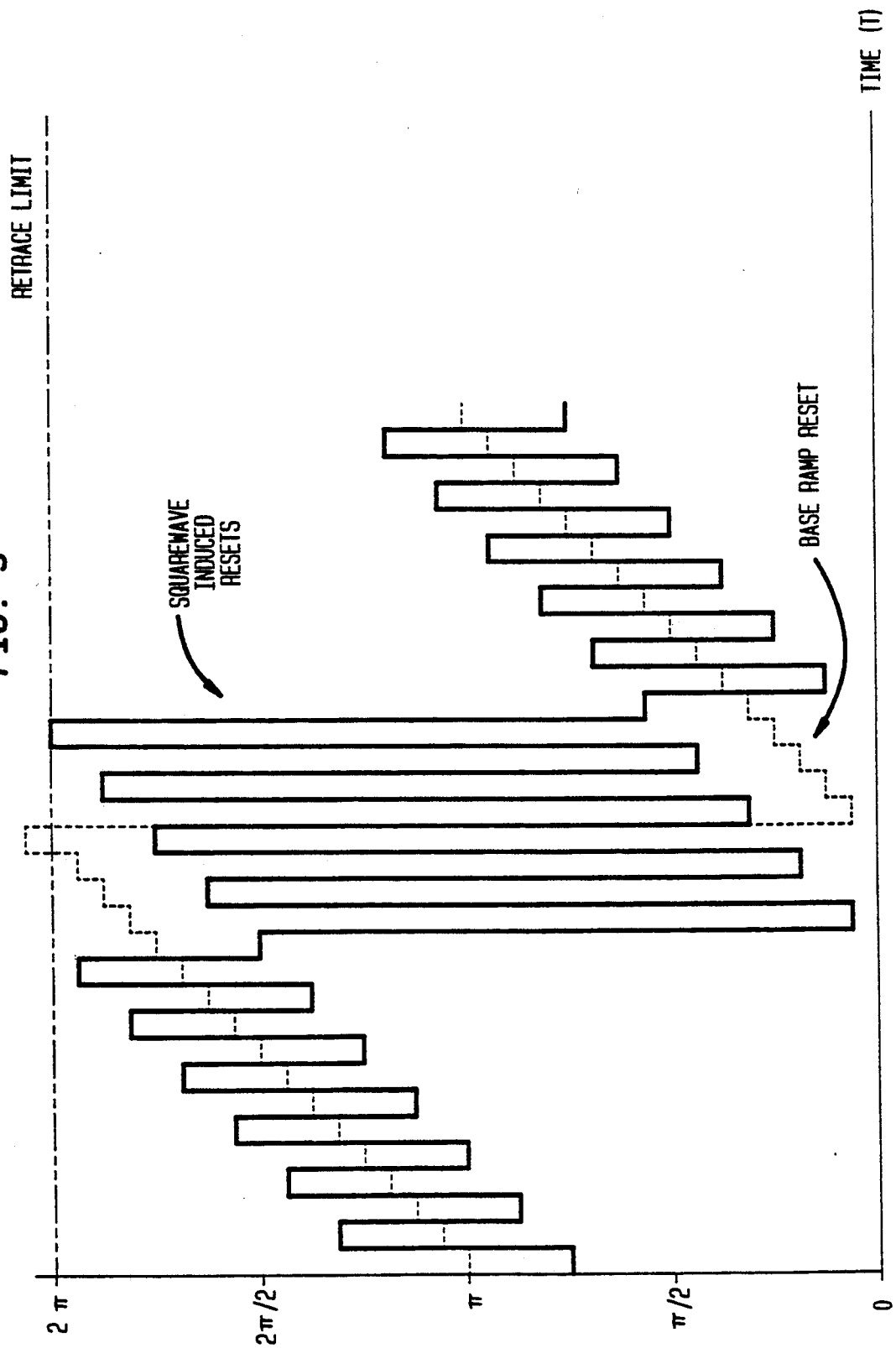
FIG. 9 is a graphical representation illustrating a retrace limit established in accordance with the invention.

It will now be appreciated that the improved gyro performance feature of the present invention is achieved by adding square wave phase modulation to the modulation drive signal after the overflow logic, in either the analog or digital domain. Therefore, a square wave modulation will not cause the generated ramp to exceed overflow/underflow limits. In the most common case, the square wave modulation has an amplitude of ($\pm\pi/4$) radians for maximizing the error signal. In this case, the phase modulation will cause a retrace with each modulation period when the amplitude of the ramp is less than ($\pi/4$) or greater than the retrace threshold minus ($\pi/4$). With a retrace threshold of ($2\pi$), the signal processing will spend one-fourth of its time in the retrace mode. In addition, a large number of overflow/underflow pulses will typically accompany a retrace. This feature is illustrated in FIG. 9, wherein the retrace limit is shown and the base ramp reset waveform (shown in dotted lines) is superimposed on the square wave induced resets.

It will be appreciated that, even though the signed sum of overflow and underflow pulses will ultimately be correct, any polling of the accumulated pulses could potentially have an error of one pulse, if the polling was done during the time period when the square wave modulation was providing pulses.

Further, one manifestation of the present invention considers the square wave amplitude from the cycle immediately after a retrace as errant data that should be excluded from the phase nulling loop. With this arrangement, the phase nulling loop would have more input data so that the feedback will be accomplished more effectively, resulting in improved gyro performance.

It will be realized that through a digital processing period following a reset, the square wave amplitude of the preceding period is repeated. This prevents the use of errant data containing reset errors in the phase nulling loop.

Also, the integrations in the phase nulling loop take place in a digital form. This enables the unique features of digital integration.

The effects of the power spikes which occur in the square wave output are diminished through the use of high bandwidth gain with data sampling. This eliminates the need for synchronized blocking (or gaining) of the spikes. This is an effective arrangement for reducing errors caused by the power spikes.

It will also be appreciated that the phase modulator drive is AC coupled. The elimination of a DC level reduces the voltage excursion of the modulator driver and results in greater linearity in the modulator transfer function.

Further, the signal processing implementation described provides a value of the instantaneous rotational rate input into the gyro.

With the above description of the invention in mind, reference is made to the claims appended hereto for a definition of the scope of the invention.

What is claimed is:

1. A method for enabling a fine resolution of the accumulated angular rotation of a fiber optic gyro of the type having clockwise and counterclockwise light beams traveling around a fiber optic coil and using square wave phase modulation in a phase nulling feedback loop for developing an error signal corresponding to the phase difference between the clockwise and counterclockwise beams, said method comprising:

applying square wave phase modulation to a modulation drive signal after overflow logic for preventing a phase modulation ramp from exceeding overflow/underflow logic limits;

the phase modulation causing a retrace when the amplitude of the ramp exceeds selected limits;

correcting a limit of the retrace so as to scale a digital output for enabling the fine resolution of the accumulated gyro angular rotation; and developing the error signal as the difference between the square wave amplitude of the modulation cycle just preceding a retrace and the square wave amplitude of the modulation cycle just following said retrace.

2. A method as described by claim 1, wherein:

applying square wave modulation to the modulation drive signal after overflow logic includes adding the square wave modulation to the modulation drive signal.

3. A method as described by claim 1, including:

filtering the error signal; and using the filtered error signal as a retrace limit determination.

4. A method as described by claim 1, including:

filtering the error signal; and using the filtered error signal as a retrace scale factor determination.

5. A method as described by claim 3, wherein:

filtering the error signal includes using an initially small filter time constant for providing fast settling of the limit value determination when the gyro is turned on; and said filter time constant increasing as the retrace occurs an increased number of times for smoothing the digital output and for reducing the influence of any single piece of data on said output.

6. In a fiber optic gyro of the type having clockwise and counterclockwise light beams traveling around a fiber optic coil, and having square wave phase modulation in a phase nulling feedback loop for developing an error signal corresponding to the phase difference between the clockwise and counterclockwise beams, an arrangement for enabling a fine resolution of the accumulated angular rotation of the gyro comprising:

means for generating a square wave phase modulation output;

means for generating a modulation drive output;

means for combining the phase modulation output and the modulation drive output after overflow logic, whereby a phase modulation ramp is prevented from exceeding overflow/underflow logic limits;

the phase modulation output being effective for causing a retrace when the amplitude of the ramp exceeds selected limits, said retrace having limits;

means for correcting the retrace limits for scaling a digital output which enables the fine resolution;

means for determining the amplitude of the square wave modulation output of the modulation cycle just preceding a retrace;

means for determining the amplitude of the square wave modulation output of the modulation cycle just following the retrace; and means for developing the error signal as the difference between said determined square wave modulation outputs.

7. An arrangement as described by claim 6, wherein:
the means for combining the phase modulation output and the modulation drive output includes means for adding said outputs.

8. An arrangement as described by claim 6, including:
means for filtering the error signal; and
means for using the filtered error signal to determine a retrace limit.

* * * * *